United States Patent [19]

Stem, Jr.

[11] Patent Number: 5,126,998
[45] Date of Patent: Jun. 30, 1992

[54] METHOD AND APPARATUS FOR TRANSMITTING AND RECEIVING A CARRIER SIGNAL WHICH IS SIMULTANEOUSLY FREQUENCY AND PHASE MODULATED

[75] Inventor: Albert M. Stem, Jr., Tulsa, Okla.

[73] Assignee: U.V. Satellite Resources, Inc., Tulsa, Okla.

[21] Appl. No.: 525,110

[22] Filed: May 16, 1990

[51] Int. Cl.$^5$ .............................................. H04J 14/00
[52] U.S. Cl. ........................................ 370/11; 370/12; 375/46; 375/79
[58] Field of Search ............... 375/45, 46, 52, 55, 375/62, 67, 79, 81, 87; 370/11, 12, 110.4, 49.5, 50, 70; 329/307, 316, 325, 326; 332/119, 145

[56] References Cited

U.S. PATENT DOCUMENTS

| | | | |
|---|---|---|---|
| 3,737,578 | 6/1973 | Matsuo | 375/81 |
| 4,255,810 | 3/1981 | Solomon et al. | 375/87 |
| 4,654,864 | 3/1987 | Ichiyoshi | 375/81 |
| 4,677,608 | 6/1987 | Forsberg | 370/11 |

Primary Examiner—Benedict V. Safourek
Assistant Examiner—Shick Hom
Attorney, Agent, or Firm—Head & Johnson

[57] ABSTRACT

A method and apparatus for transmitting and receiving a carrier signal which is simultaneously frequency and phase modulated, including a carrier signal, a frequency modulator for imposing on the carrier signal an analog information signal, a bi-phase shift key modulator for modulating the frequency modulated carrier with a digital information signal to provide an output frequency and phase modulated carrier signal, a receiving system including a multiplier by which the received composite signal is multiplied by two to cancel out the bi-phase modulation and thereby derive a frequency modulated only signal, demodulating the multiplied frequency modulated signal utilizing a frequency demodulation network and comparing the derived frequency modulated signal with the received transmitted signal to derive the digital information signal.

12 Claims, 2 Drawing Sheets

METHOD AND APPARATUS FOR TRANSMITTING AND RECEIVING A CARRIER SIGNAL WHICH IS SIMULTANEOUSLY FREQUENCY AND PHASE MODULATED

SUMMARY OF THE INVENTION

The present invention relates to a communication system wherein both frequency modulated (FM) signals and phase modulated (PM) signals coexist on a single carrier.

A carrier signal that is simultaneously amplitude modulated and phase modulated is known in the art. Simultaneous phase modulation and amplitude modulation does not interfere with one another when they are transmitted on the same carrier because they are not integrally related to one another. Both signals may be recovered without suffering significant degradation.

Frequency modulation and phase modulation, however, are related to one another and therefore interfere with each other.

A frequency modulated signal is represented as:

$$x(t) = A \cos[wt + \Delta w \int^t f(\phi) d\phi]$$

where:
$\Delta w$ = frequency deviation
A phase modulated signal is represented by:

$$x(t) = A \cos \phi(t) = A \cos[wt + \Delta \phi f(t)]$$

where:
w = carrier frequency
A = carrier amplitude
$\Delta \phi f(t)$ = instantaneous phase Hence, the essential distinction between FM and PM is that in FM, the message is integrated. Since FM and PM are related to one another, it was generally believed that both forms of modulation could not be simultaneously sent on a single carrier because the FM and PM signals would significantly interfere with one another and therefore could not be recovered.

In the past, FM and PM modulated signals have been sent on the same datapath; however, in this known system the phase of the carrier is modulated and then, after a time delay, the frequency of the carrier is modulated. Thus, while both modulation forms exist on the same carrier, they are not transmitted simultaneously.

Similarly, a receive signal may combine frequency and PSK signals which have been modulated by orthogonal code words, by mixing sine and cosine signals, respectively, at the mark and space frequencies. The sine and cosine receive signals are in phase and quadrature and are demodulated by the "in phase and quadrature" demodulation technique.

A basic objective of this disclosure is to provide a method system wherein FM and PM may be transmitted on a single carrier and neither modulated signal suffers significant degradation when recovered and demodulated.

The PM signal used is discrete in nature: i.e. +/− some fixed deviation. In the preferred embodiment, the particular PM technique employed is bi-phase shift keying (BPSK).

In the practice of the invention an analog or digital information signal is used to provide frequency modulation and a digital information signal is used to provide phase modulation while the signal used for frequency modulation may be either analog or digital, for purposes of clarity, the invention described will employ an analog signal for frequency modulation to more easily distinquish it from the digital signal employed for phase modulation.

The FM analog signal is recovered by first passing the composite signal (FM+PM) through a times two($\times 2$) frequency multiplier. This strips out the phase modulation although the resulting frequency modulated signal is at twice the original carrier frequency ($2F_{fm}$). A phase locked loop is used to demodulate the resulting frequency modulated signal and to recover the original analog modulating signal.

The digital phase modulation signal is recovered by comparing the composite signal (FM+PM) with a signal out of a multiplied by two followed by a divide by two circuit and passing the derived signal through a low pass filter.

For reference to prior art generally relating to the subject matter of this invention, see the following U.S. Pats Nos: 4,255,810; 4,498,050; 4,247,943; 4,290,140; 4,090,145; 3,470,478; 3,384,822; 3,032,611; 3,750,051; 3,023,269.

DETAILED DESCRIPTION OF THE PREFERRED EMBODIMENTS

Figure 1:
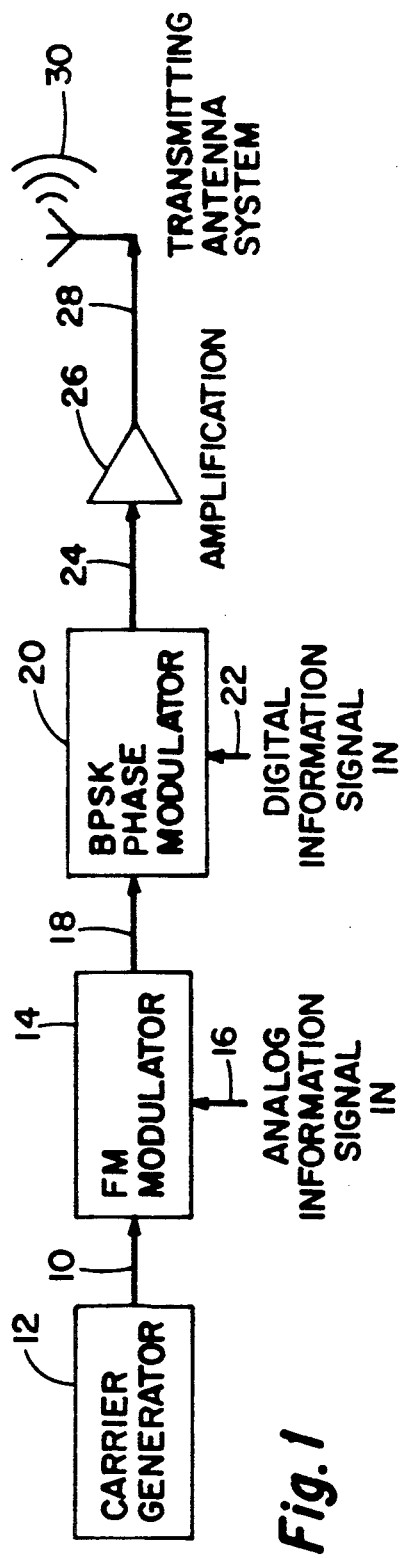
FIG. 1 is a block diagram of a system for transmission of a carrier signal which is simultaneously frequency and phase modulated.

Referring to FIG. 1, a transmission system is illustrated. A radio frequency carrier signal at 10 is provided by a carrier generator 12. The carrier signal is fed to a frequency modulator 14 of any type commonly known or characteristically employed for frequency modulating a carrier signal. The carrier signal is modulated using a first information signal, which, for convenience of illustration, will be referred to as an analog information signal at 16.

Carrier generator 12 and FM modulator 14 may be a combined unit known as a Satellite Uplink Exciter.

The resulting spectrum bandwidth of the signal at 18 is a frequency modulated signal of the carrier signal 10 by the data signal 16 with a spectrum as follows:

$$BW_{fm} = 2 * (HMF + DEV_{pk})$$

where:
$BW_{fm}$ = the resulting spectrum bandwidth of the modulated signal
HMF = the highest modulating frequency
$DEV_{pk}$ = peak deviation of the FM carrier by the modulating signal(s)

The FM modulated signal 18 ($F_{fm}$) out of the FM modulator 14 and a data signal 22 (typically digital) are input to the phase modulator 20. The phase modulator phase shifts the data signal 22 and the previous frequency modulated signal 18 by a preselected factor, which preferably is accomplished using a BPSK modulator 20 which produces a phase shift of $+/-180°$ in the FM modulated signal 18 in response to the digital data signal 22. The phase modultor simultaneously mixes the FM signal at 18 and the digital data signal 22 and forms a composite FM/PM signal 24.

The resulting composite signal at 24 has a spectrum bandwidth of:

$$BW_{tot} = BW_{fm} = DR$$

where:
- $BW_{tot}$ = the total spectrum bandwidth occupied by the combined FM/BPSK modulated signal
- $Bw_{fm}$ = spectrum bandwidth of the above described FM modulated signal
- $DR$ = data rate in bits/second applied to the modulating input of the BPSK modulator The resulting composite FM+BPSK modulated signal ($F_{fm}+BPSK^{OUT}$) at 24 is amplified at 26 and fed by 28 to a transmission system 30.

The function of the transmitter of FIG. 1 is therefore to transmit a signal carrying information represented by both frequency modulation and phase modulation of the carrier so that at one or more distant locations the analog information signal 16 and the digital information signal 22 may be recovered. The information employed for frequency modulation is unrelated to the information employed for phase modulation.

The output of phase modulator 20 at 24 is fed to an amplification system represented by amplier 26 and the amplified frequency and phase modulated carrier signal at 28 is fed for transmission, such as to a transmiting antenna 30. Its is understood that antenna 30 is only emblematic as the signal at 28 can be fed to an optical waveguide or any other means by which modulated carrier signals are conveyed from one point to another.

Figure 2:
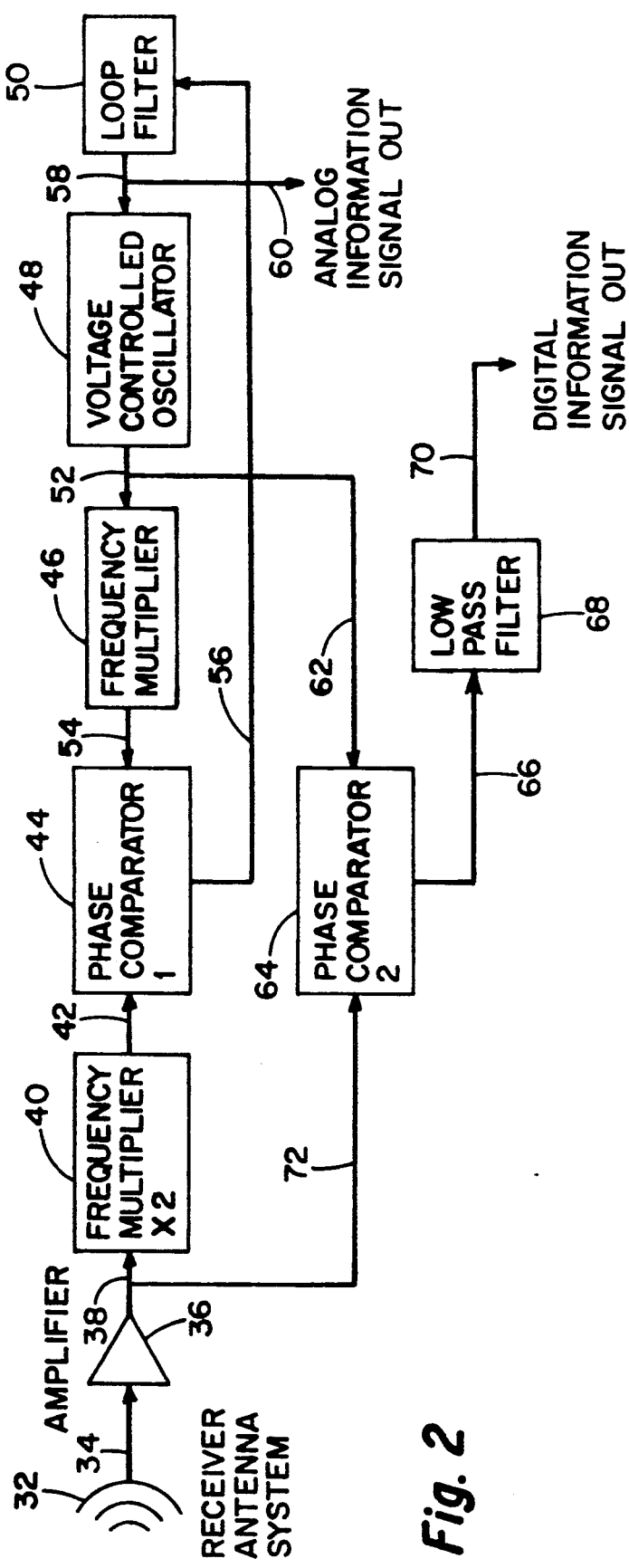
FIG. 2 is a block diagram of a preferred system for receiving a carrier signal which is simultaneously frequency and phase modulated and for demodulating the received signal to provide both the frequency modulation signal and the phase modulation signal.

Referring to FIG. 2, the transmitted signal is received, such as by a receiving antenna 32, which, like transmitting antenna 30 is emblematic of any standard method of receiving a modulated carrier signal. The received signal from antenna 32 at 34 is fed to an amplification system, illustrated by amplifier 36. The amplified output at 38 is essentially the same FM and PM modulated carrier signal at 24 or 28 of the transmitter of FIG. 1.

The signal at 38 is fed to a times two ($\times 2$) frequency multiplier 40. The composite FM+BPSK signal at 38 is multiplied to provide the original FM modulated signal at twice its normal frequency appearing at 42. The composite signal 38 is times two multiplied to null out the phase modulation component. Since the BPSK modulator 20 phase shifted the FM signal at 18 by 180°; two times the phase deviation ($2 \times 180°$) is 360°. However, the FM modulated signal at 42 also has twice its normal bandwidth. The recovered FM signal at 42, at twice its original frequency ($2F_{fm}$), is then input into a carrier recovery loop section.

The purpose of the carrier recovery loop section is to demodulate the recovered FM signal at 42. The carrier recovery loop section employs standard FM demodulation techniques. In the preferred embodiment the FM demodulation section comprises a phase locked loop having a first phase comparator 44, a frequency multiplier 46, a voltage controlled oscillator (VCO) 48 and a loop filter 50. Frequency multiplier 46 is not employed in the usual FM demodulation circuit and would not be useable in a standard FM demodulation circuit. The frequency multiplier 46 is used since it permits the VCO 48 to operate at one half of the frequency at 42 to thereby provide at 62 frequency matching at 72 for input into second comparator 64.

The VCO 48 operates at 1/N the frequency of the original FM signal $F_{fm}$ with which the VCO 48 is attempting to achieve lock. The frequency multiplier multiplies the frequency of the signal generated by the VCO 48 by N, where N is an integer. In the preferred embodiment, N=2. The VCO 48 operates at $\frac{1}{2}$ the frequency at which the signal to which it is attempting to achieve lock. The frequency multiplier 46 is a times two multiplier. Since N=2, the carrier recovery loop is commonly called a "dividing" phase locked loop.

The VCO 48, in attempting to achieve lock with the original $F_{fm}$ at 38 generates a tracking frequency signal 52 which is multiplied by the times two frequency multiplier 46 to provide the signal at 54.

The times two multiplied tracking frequency signal at 54 and the recovered FM signal at 42 are input into the first phase comparator 44. The frequencies of the two signals at 42 and 54 are compared and the comparator 44 outputs an error voltage at 56 which represents the comparison between the frequency of the two signals. The error voltage signal at 56 loops back to the loop filter 50 which filters the signal before it is input at 58 into VCO 48. The process continues until the frequency of the two signals at 42 and 54 are substantially the same. At this point the VCO 48 has "locked" into the frequency of the original FM signal. When this occurs, the output of the phase locked loop filter 50 at 58, 60 represents the demodulated FM signal 16.

Once lock is achieved, the final signal out of the VCO 48 is a replica of the original FM modulated wave 18 and has a value of $F_{fm}$. The replicated FM signal $F_{fm}$ at 52 and 62 is input into a second phase comparator 64. The PM data recovery is achieved by the second phase comparator 64 and at 66 is fed through a low pass filter 68 to provide the digital information signal at 70.

Data recovery of the phase modulated signal is achieved by inputting the replicated FM signal $F_{fm}$ at 62 into the second phase comparator 64 along with the composite FM +BPSK input signal ($F_{fm}+BPSK^{in}$) at 38 and 72. By combining, in the second comparator 64, the composite FM+BPSK signal ($F_{fm}+BPSK^{in}$) at 38, 72 with the FM modulated signal ($F_{fm}$) at 52, 62, the signal is stripped of its modulated component and the modulated (PM) signal 22 is recovered. That is, comparator 64 provides an error voltage which is the difference between the signals at 62 and 72 which is the recovered digital information signal 22 at 66. Stating it another way the PM signal is recovered because when the phase of both the composite FM+BPSK signal 38, 72 and the recovered demodulated $F_{fm}$ signal 52, 62 are compared, the output of the second comparator 64 is the original digital signal 22 appearing at 66. The digital informational signal at 66 is preferably fed through the low pass filter 68 to provide the final digital information signal output at 70.

The analog information signal at 60 is a replica of the analog information signal input at 16 of the transmitter system of FIG. 1.

Figure 3:
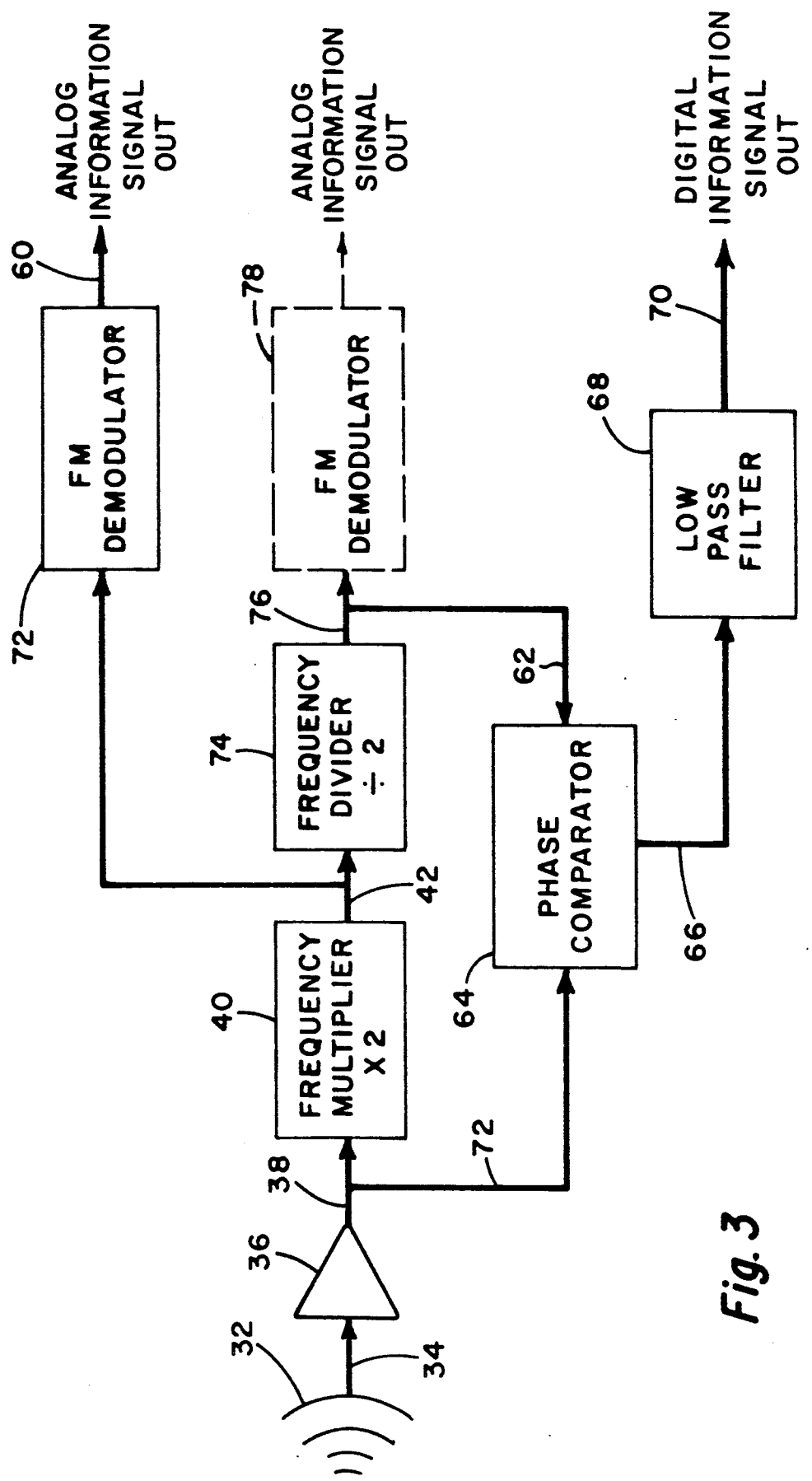
FIG. 3 is a block diagram of a simplified system for receiving a carrier signal which is simultaneously frequency and phase modulated and for demodulating the received signal to provide both the frequency modulation signal and the phase modulation signal.

FIG. 3 shows a simplified receiving system in which the comparable components of FIG. 2 are given the same identification numbers. After the received signal has been multiplied to cancel out the bi-phase modulation the signal may be FM demodulation using any standard FM demodulation system indicated by block 72, such FM demodulation systems being well-known to communication engineers. The signal at 42, being 2(FM+PM) is passed to a fequency divider 74 to provide an amplified phase modulation signal out at 62 having the frequency of the transmitted signal received at 34, but with phase modulation removed. This signal is fed by 62 to the phase comparator 64 from which the digital information signal is derived at 66. The derived signal is conveyed to low pass filter 68 to provide the output digital information signal at 70.

As an alternative, the analog information signal may be obtained by passing the signal from frequency divider 74 appearing at 76 to a standard FM demodulator 78. The Fm demodulator 78 is shown in dotted outline since it is redundant, that is, if used it would be in place of demodulator 72. The difference in use of demodulator 72 compared to demodulator 78 is that demodulator 72 utilizes the modulated carrier of twice the carrier transmission frequency while demodulator 78 uses the carrier frequency that is the same as the transmitted carrier received at 34.

The circuit arrangement of FIG. 2 is a preferred embodiment for practicing the basis receiver concept of FIG. 3.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of simultaneously transmitting information in a first analog form and a second digital form with unitary transmission and reception means, the method comprising:
    (a) generating a carrier signal;
    (b) frequency modulating the carrier signal from step (a) with a first analog information signal to provide a frequency modulated carrier signal;
    (c) bi-phase shift key modulating the frequency modulated carrier signal from step (b) with a second digital information signal to provide a frequency and bi-phase modulated carrier signal, the analog and digital signals being unrelated;
    (d) amplifying the frequency and bi-phase modulated carrier signal from step (c) and directing such amplified signal to a transmitting means;
    (e) receiving the transmitted signal from step (d) at a spaced location;
    (f) multiplying the received transmitted signal of step (e) by two to cancel out the bi-phase shift key modulation and derive a frequency modulated only signal;
    (g) demodulating the multiplied signal from step (f) in a frequency demodulation network to recover the first information signal;
    (h) divide the frequency modulated only signal from step (f) to produce an FM signal identical to the transmitted signal without phase modulation; and
    (i) comparing the derived frequency modulated signal of step (h) with the received transmitted signal of step (e) to obtain the second digital information signal.

2. The method of claim 1 wherein step (g) is accomplished using a frequency demodulation network including a phase lock loop means.

3. The method of claim 2 wherein said frequency demodulation network includes a phase comparator having a first input of said frequency modulated only signal derived from step (f) and a second input which is the output of said voltage controlled oscillator multiplied by two, the output of the phase comparator providing said first information signal of step (g).

4. The method of claim 1 including the step of passing the output of step (i) through a low pass filter to obtain the digital information signal.

5. A system for transmitting a composite frequency modulated signal and a phase modulated signal simultaneously on a single carrier signal, comprising:
    means for receiving an analog information signal;
    means for receiving a digital information signal;
    means for frequency modulating the carrier signal by the analog information signal to produce a frequency modulated signal; and
    means of bi-phase shift key modulating said frequency modulated signal to provide a transmit signal.

6. A system for receiving and demodulating a transmitted composite signal, the composite signal being a carrier signal frequency modulated by an information signal, the frequency modulated signal further bi-phase shift key modulated by a digital information signal, comprising:
    means for separating the FM signal from the composite signal;
    means for demodulating the FM signal to derive the information signal; and
    means for receiving the separated FM signal and the composite signal, and for deriving therefrom the digital information signal.

7. The system for receiving and demodulating a transmitted composite signal of claim 6 wherein the means for separating the FM signal comprises:
    means for multiplying the composite signal by two such that the bi-phase shift key modulated signal is nulled.

8. The system for receiving and demodulating a transmitted composite signal of claim 6 wherein the means for separating the FM signal comprises:
    a times two frequency multiplier.

9. The system for receiving and demodulating a transmitted composite signal of claim 6, wherein said for demodulating the separated FM signal comprises:
    means for generating a tracking frequency signal to compare with the frequency of the demodulated FM signal such that a compared freqency signal is generated, the compared frequency signal being the demodulated FM signal.

10. The system for receiving and demodulating a transmitted composite signal of claim 9, wherein said means for generating a tracking frequency signal comprises:
- a means for generating an oscillating voltage signal, the voltage signal having a frequency which is the inverse of a first preselected factor;
- a means for multiplying said voltage frequency signal by said first preselected factor;
- a first means for comparing the frequency of said separated FM signal and said multiplied voltage frequency signal in a first phase comparator means and for generating a first comparison signal indicating the comparison results, the first comparison signal being input into said oscillating voltage signal generating means to generate said oscillating voltage signal; and
- means for outputting the said analog signal when the frequency of said frequency modulated separated signal is substantially the same as the frequency of said multiplied voltage frequency signal.

11. The system for receiving and demodulating a transmitted composite signal of claim 10, wherein the means for demodulating the separated Fm signal is a phase locked loop.

12. The system for receiving and demodulating a transmitted composite signal of claim 10 wherein said means for deriving said digital information signal is a second phase comparator means.

* * * * *

UNITED STATES PATENT AND TRADEMARK OFFICE
CERTIFICATE OF CORRECTION

PATENT NO. : 5,126,998
DATED : JUNE 30, 1992
INVENTOR(S) : ALBERT M. STEM, JR.

It is certified that error appears in the above—identified patent and that said Letters Patent is hereby corrected as shown below:

```
COLUMN 1 LINE 51    CHANGE "signal." to --signal,--
COLUMN 3 LINE 11    CHANGE "=" to -- + --
```

Signed and Sealed this

Tenth Day of August, 1993

Attest:

MICHAEL K. KIRK

Attesting Officer     Acting Commissioner of Patents and Trademarks

UNITED STATES PATENT AND TRADEMARK OFFICE
CERTIFICATE OF CORRECTION

PATENT NO. : 5,126,998
DATED : June 30, 1992
INVENTOR(S) : Albert M. Stem, Jr.

It is certified that error appears in the above-indentified patent and that said Letters Patent is hereby corrected as shown below:

Column 5, line 5, change "2(FM + PM)" to --2(FM -PM)--.

Signed and Sealed this

Twenty-first Day of December, 1993

Attest:

BRUCE LEHMAN

*Attesting Officer*  *Commissioner of Patents and Trademarks*